NO CHATTER

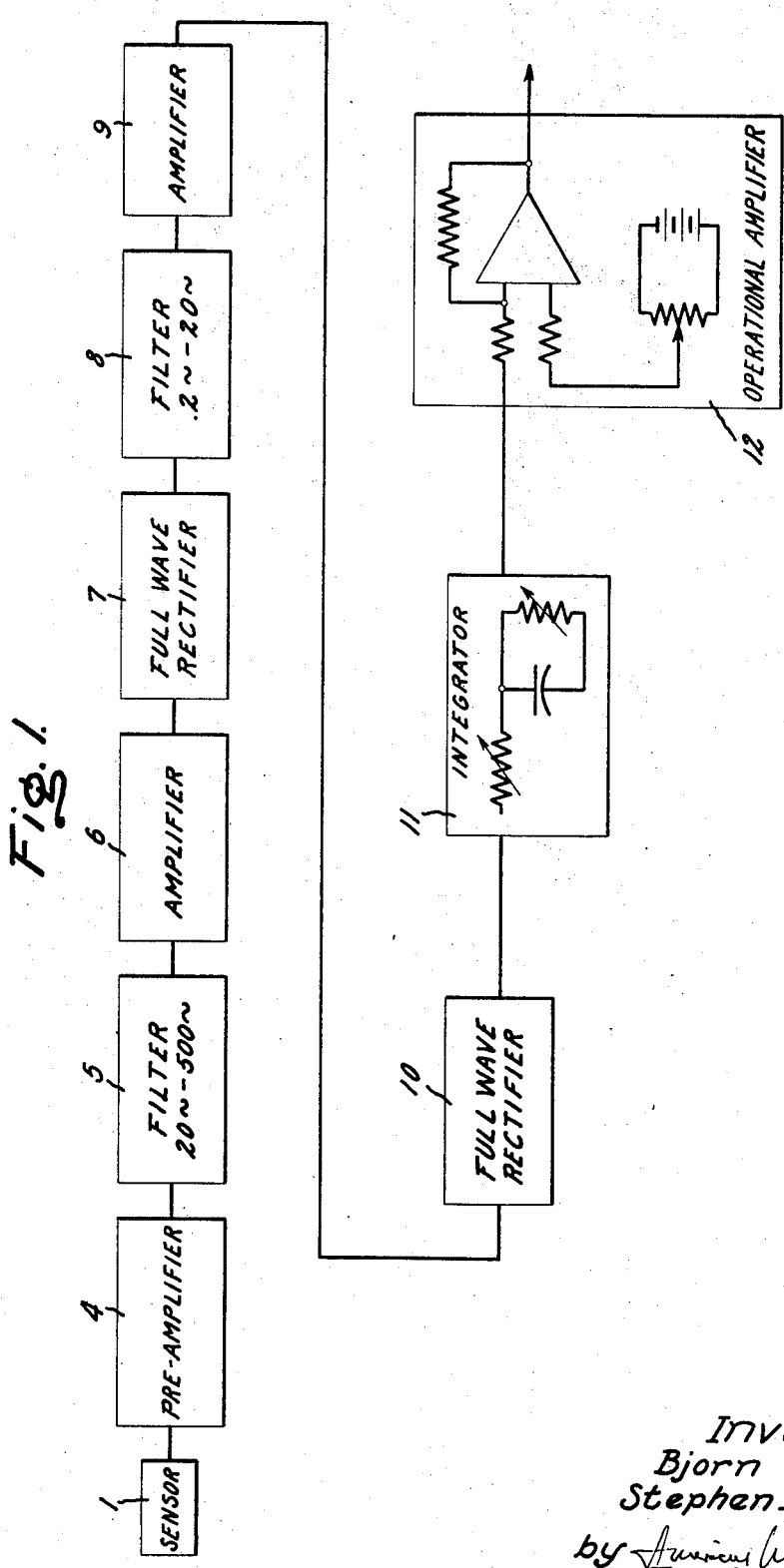

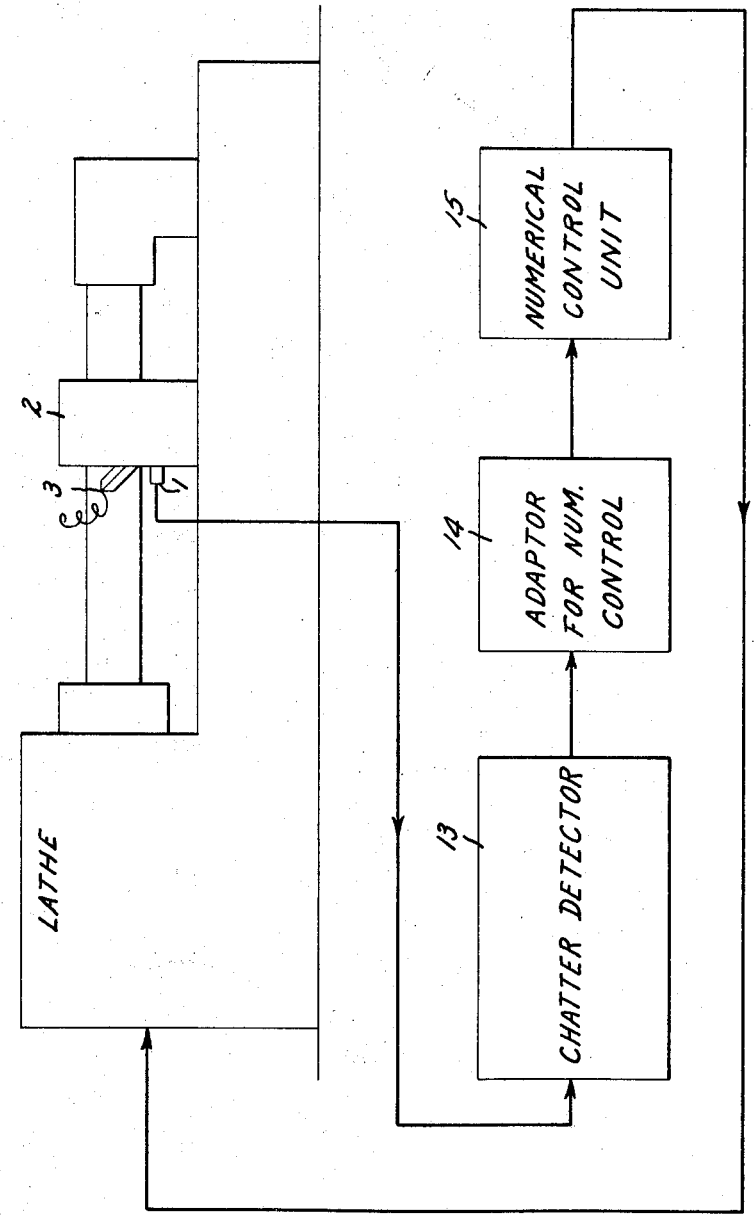

CHATTER

*Inventors:*
*Bjorn Weichbrodt,*
*Stephen E. Grabkowski,*
by *Their Attorney.*

United States Patent Office 3,504,581
Patented Apr. 7, 1970

3,504,581
APPARATUS FOR EARLY DETECTION OF TOOL CHATTER IN MACHINING OPERATIONS
Bjorn Weichbrodt and Stephen E. Grabkowski, Schenectady, N.Y., assignors to General Electric Company, a corporation of New York
Filed Apr. 24, 1967, Ser. No. 632,974
Int. Cl. B23b 1/00
U.S. Cl. 82—1
6 Claims

ABSTRACT OF THE DISCLOSURE

A method and apparatus for automatic control of machining operation so that high metal removal rate can be obtained without the risk of unstable cutting conditions (tool chatter). The apparatus detects incipient tool chatter during a machining operation by the use of the essential method of determining the vibration characteristics of the cutting tool and assembly and then regulates the speed of the feed of the cutting edge. By detecting variation from normal vibration of the cutting tool, a signal is generated causing the control to automatically adjust feed speed so as to keep the machining operation just on the verge of chatter.

---

As one means of accomplishing this result, a vibration sensor is attached to the tool holder or tool holder post which senses raw vibration data and feeds it to a chatter detector which extracts the chatter information from the raw data and then feeds this information to an adaptor for numerical control which feeds a numerical control unit and this in its turn transmits machining parameters adapted to cutting conditions to a control device operative to control feed rate of the machine tool.

Our invention relates to a method and apparatus for the early detection of tool chatter and most particularly for the early detection and control of the undesirable condition known as tool chatter by regulating the feed of the tool. The present invention encompasses both a new method and apparatus for programming the feed of machining just below that feed rate at which chatter would take place.

An object of this invention is to maintain a maximum metal removal rate just short of chatter.

It is another object of this invention to continuously monitor the cutting stability and keep cutting speed as high as possible.

It is a final object of this invention to give maximum metal removal rate with a smooth surface finish.

In brief, our invention is a device to insure maximal metal removal rate without chatter by sensing vibrations from a cutting tool, separating the vibration characteristic of chatter or incipient chatter, i.e., the "chatter discriminant," and using the level of this discriminant to regulate the speed of feed of the cutting tool. When the signal level is high the regulator will slow down the rate of feed, while if the signal level is at the desired incipient chatter level the rate of feed will be unaltered and if the signal level is low the rate of tool feed will be increased until the vibrations from the cutting tool are at the incipient chatter level. In this way maximal metal removal rate and a smooth surface finish are insured.

Additional objects and features of the invention pertain to the particular structural arrangements whereby the above objects are attained. In order that the principle of the invention may be readily understood, a single embodiment thereof is described and applied to a numerically controlled lathe to which the application is not restricted as shown in the accompanying drawings.

FIGURE 1 shows a block diagram of the chatter detector.

FIGURE 2 shows the chatter detector tied to a numerically controlled lathe to form the closed loop adaptive control system of our invention.

Figure 3A:
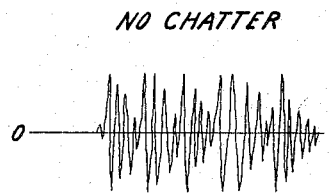
FIGURES 3A through 3E show the signal output at different stages of the detector unit under conditions of no chatter.
Figure 3A:
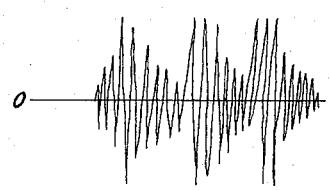

FIGURES 3A' and 3E' show the signal output at different stages of the detector unit under conditions of chatter.

The essential steps in the operation of this embodiment are:

First, during machining operation sense vibration of the tool post.

Second, filter the raw vibration signal in a wide band pass filter to enhance the frequency range where the significant chatter information is located.

Third, feed the filtered signal into an instrument which detects periodic increases of the signal energy with time, provided that the increases exceed a certain value.

Fourth, from the output of this instrument generate a voltage level which is proportional to the repetition frequency of the periodic increases and the magnitude of the increases. This voltage level is the "chatter level."

Fifth, regulate the speed of the machining to just below the chatter point.

In the lathe chatter detector illustrated in FIGURES 1 and 2, the vibration sensor 1 which may be, for example, a conventional accelerometer, is mounted on the tool post edge 3 are readily transmitted through the tool post to the 2 in such a way that the vibrations generated at the cutting sensor.

The output signals from the vibration sensor 1 are supplied to a preamplifier 4. The output from amplifier 4 is supplied to a filter 5, such as a Krohn-Hite filter, which serves as a band pass filter which removes all signals except those having a frequency between 20 and 500 cycle per second. The function of filter 5 is to eliminate high frequency signals, which are not indicative of chatter, and very low frequency signals, but retain signals in the 20–500 c.p.s. band where the majority of chatter information is located. The output of filter 5 is supplied to an amplifier 6 for example an Arvee decade amplified. The output signals from amplifier 6 are fed into a full wave rectifier 7 whose rectified signal output is fed into a second band pass filter 8 which surpresses all signals except those having a frequency between 0.2 and 20 c.p.s. Variations within this frequency range corresponding to the envelope of the rectified signal are passed. The output signals of the second filter 8 are conducted through an amplifier 9 to a second full wave rectifier 10 and the output of the second rectifier is smoothed by an integrator 11 which converts the rectified signal to a relatively smooth voltage wave where intensity or level is dependent upon the extent of the chatter. The output signal of the integrator is then supplied to an operational amplifier 12 which provides a negative bias voltage whose level is used for control purposes. The operational amplifier 12 is the last unit in the chatter detector.

The output of the chatter detector 13 is then fed into the adaptor 14 for the numerical lathe control unit (FIGURE 2). If the output voltage of the operational amplifier 12 above is a preset voltage, i.e., the chatter indicator says "above normal" the numerical control 15 decreases the feed rate of the cutting tool. If the output is below the preset threshhold voltage, the numerical control 15 increases the feed. If the output is zero or near zero, the feed remains unchanged. The operational amplifier 12 can be adjusted to any desired voltage level. Consequently, by selecting the voltage level which is converted by the operational amplifier to zero, any chatter level can be selected as "normal." This is valuable since the surface finish requirements for a rough cut and a finish cut are not the same. Thus, a closed loop adaptive control of the machining operation is accomplished.

Figure 3B:
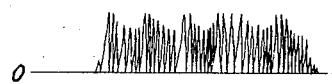
Figure 3B:
Figure 3C:
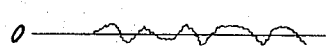
Figure 3C:
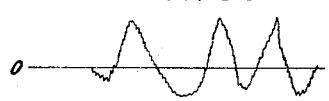
Figure 3D:
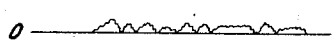
Figure 3D:
Figure 3E:
Figure 3E:

The electrical signals at various stages of the apparatus are shown in two groups of figures, FIGURES 3A through 3E and FIGURES 3A' through 3E'. The FIGURES 3A through 3E show the signals when no chatter is present and FIGURES 3A' through 3E' show the signals when chatter is present. FIGURE 3A and FIGURE 3A' show the signals obtained from the first band pass filter 5. FIGURE 3B and FIGURE 3B' show the signals as they would appear at the output of the first rectifier 7. FIGURE 3C and FIGURE 3C' show the signals obtained from the output of the second band pass filter 8. The signals from the second full wave rectifier 10 are shown in FIGURE 3D and FIGURE 3D'. The smoothed output signals of the integrator 11 is shown in FIGURE 3E and FIGURE 3E'. The no chatter signal has a voltage of approximately zero after integration while a positive voltage appears where chatter occurs as seen in FIGURE 3E. These are the signals supplied to adaptor 12.

The operation of this machine when cutting a long moderately thin bar is as follows. During machining, mechanical vibrations generated at the cutting edge of the tool are sensed by sensor 1 mounted to the tool post. The signal from the sensor is then processed in a chatter detector as described above. So long as the tool cuts without chatter, no chatter indication is given. Taking, for example, a long thin bar, the bar is stabilized by the chuck at one end of the bar and a spindle support at the other end of the bar. As the tool works from one end of the bar toward the center, chatter begins to appear because the center of the bar is more resilient than the ends, and the feed rate is reduced by the control system until the chatter disappears. Thus, at the center of the bar, where the chatter would normally be highest, the feed rate is reduced to the minimum speed for that bar. As the tool continues to cut, the rate of feed will be somewhat accelerated because the other end of the bar is supported and therefore less chatter prone. This procedure is followed throughout the entire traverse of the tool. That is, the control oscillates the feed speed in small increments around the optimum level to avoid chatter and thus produces a smooth surface finish. Feed speed increases as the cutter approaches the end of the bar since the end of the bar does not chatter easily. The cutting speed is continuously regulated to give an operation just on the verge of chatter with a high metal removal rate. This is a desirable result which gives maximum economy for a given surface finish.

We have found that when machining a steel bar of small diameter and using our control, one cutting pass can be completed more than twice as fast as if the feed speed were kept constant during the entire pass. This is because the center of a bar chatters more easily than the ends which are mounted within fixed spindles.

The foregoing is a description of an illustrative embodiment of the invention and it is the applicants' intention in the appended claims to cover all forms which fall within the scope of the invention.

What we claim as new and desire to secure by Letters Patent of the United States is:

1. In combination with a machine tool which includes a cutting tool, means for holding a workpiece, and moving means for moving the cutting tool in relation to the workpiece holding means to remove material from said workpiece, sensing means responsive to the rate of material removal for developing a unidirectional signal in accordance therewith, a reference level of said unidirectional signal representing a predetermined rate of material removal under predetermined conditions, servo means responsive to departure in level of said unidirectional signal from said reference level for controlling said moving means to bring said unidirectional signal level into correspondence therewith, the improvement in said sensing means which comprises
   a vibration sensor coupled to said machine tool for sensing vibrations therein and converting said vibrations into an electrical signal,
   means for passing the frequency components of said electrical signal lying within a predetermined band of frequencies to produce a resultant signal,
   means for deriving a unidirectional signal from said resultant signal, said unidirectional signal varying in acordance with the rate of material removal from said workpiece.

2. The combination of claim 1 in which said vibration sensor is an accelerometer mounted on said machine tool to sense the vibrations of said cutting tool.

3. The combination of claim 1 in which said means for passing frequency components of said electrical signal is a band pass filter for separating the components of said electrical signal corresponding to chatter of said machine tool from other components of said electrical signal generated by said machine tool.

4. In combination with a machine tool which includes a cutting tool, means for holding a workpiece, and moving means for moving the cutting tool in relation to the workpiece holding means to remove material from said workpiece, sensing means responsive to the rate of material removal for developing a unidirectional signal in accordance therewith, a reference level of said unidirectional signal representing a predetermined rate of material removal under predetermined conditions, servo means responsive to departure in level of said unidirectional signal from said reference level for controlling said moving means to bring said unidirectional signal level into correspondence therewith, the improvement in said sensing means which comprises
   a vibration sensor coupled to said machine tool for sensing vibrations therein and converting said vibrations into an electrical signal,
   a first filter means for passing the frequency components of said signal lying within a predetermined band of frequencies to produce a resultant signal,
   rectifier means for rectifying said resultant signal,
   second filter means for pasing the frequency components of said rectified signal lying within another predetermined band of frequencies substantially lower in frequency than said one band to produce a second resultant signal,
   second rectifier means for rectifying said second resultant signal to produce a unidirectional signal,
   said signal varying in accordance with the rate of material removal from said workpiece.

5. The combination of claim 4 in which said first filter means passes components of said electrical signal having frequencies in the band extending from 20 to 500 cycles per second and substantially rejects components of other frequencies and in which said second filter means passes components of rectified signal having frequencies in the band from 0.2 of a cycle per second to 20 cycles per second and substantially rejects components of other frequencies.

6. The combination of claim 4 in which each of said rectifiers are full wave rectifiers.

References Cited

UNITED STATES PATENTS

| | | | |
|---|---|---|---|
| 2,240,822 | 5/1941 | Adams | 318—460 XR |
| 2,498,881 | 2/1950 | Eldridge | 73—104 XR |
| 3,095,532 | 6/1963 | Floyd | 318—460 |

LEONIDAS VLACHOS, Primary Examiner

U.S. Cl. X.R.

77—1, 32.8; 90—11; 318—460